(12) United States Patent
Line et al.

(10) Patent No.: US 10,569,674 B2
(45) Date of Patent: Feb. 25, 2020

(54) MECHANISM FOR A SUPINE MOTOR VEHICLE SEATING ASSEMBLY

(71) Applicant: FORD GLOBAL TECHNOLOGIES, LLC, Dearborn, MI (US)

(72) Inventors: Johnathan Andrew Line, Northville, MI (US); James Patrick Creighton, Northville Township, MI (US); Spencer R. Hoernke, Dundas (CA); Corbin S. Johnston, Royal Oak, MI (US); Jimmy Moua, Canton, MI (US); Adam D. Ewel, Royal Oak, MI (US); Kevin R. Mozurkewich, Livonia, MI (US); Robert Lloyd Damerow, Garden City, MI (US); Paul Iacoban, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 315 days.

(21) Appl. No.: 15/447,732

(22) Filed: Mar. 2, 2017

(65) Prior Publication Data

US 2018/0251048 A1    Sep. 6, 2018

(51) Int. Cl.
*B60N 2/34* (2006.01)
*B60N 2/22* (2006.01)
(Continued)

(52) U.S. Cl.
CPC .................. *B60N 2/34* (2013.01); *B60N 2/18* (2013.01); *B60N 2/1803* (2013.01);
(Continued)

(58) Field of Classification Search
CPC .......................... B60N 2/34; B60N 2002/0216; B60N 2/1835; B60N 2/1821; B60N 2/1825;
(Continued)

(56) References Cited

U.S. PATENT DOCUMENTS

| 681,784 A | 9/1901 | Hale |
|---|---|---|
| 2,576,343 A | 11/1951 | Hibbard et al. |

(Continued)

FOREIGN PATENT DOCUMENTS

| DE | 19901072 C1 | 3/2000 |
|---|---|---|
| DE | 102005023602 A1 | 11/2006 |

(Continued)

*Primary Examiner* — Milton Nelson, Jr.
(74) *Attorney, Agent, or Firm* — Vichit Chea; Price Heneveld LLP

(57) ABSTRACT

A seat assembly forming a substantially horizontal plane for an exposed surface of each of a lower seat cushion and a seatback cushion of a seatback comprises a lifter mechanism for a rearward edge of the lower seat cushion. The lifter mechanism comprises a bracket pivotable about a transverse bar fixedly mounted to a frame assembly for a lower seat assembly, the bracket comprising a forward lever and a rearward lever; and a link pinned at a first end to the seatback and pinned at a second end to the rearward lever by a slot. The rearward edge of the lower seat cushion is initially raised by the forward lever upon the seatback pivoting to a predetermined reclined position and the rearward edge of the lower seat cushion is raised to the substantially horizontal plane upon the seatback pivoting to a fully reclined position.

3 Claims, 15 Drawing Sheets

(51) Int. Cl.
*B60N 2/18* (2006.01)
*B60N 2/64* (2006.01)
*B60N 2/02* (2006.01)

(52) U.S. Cl.
CPC ......... *B60N 2/1821* (2013.01); *B60N 2/1835* (2013.01); *B60N 2/2222* (2013.01); *B60N 2/646* (2013.01); *B60N 2002/0216* (2013.01)

(58) Field of Classification Search
CPC .......... B60N 2/18; B60N 2/2222; B60N 2/68; B60N 2/1803; B60N 2/646; B60N 2205/30
USPC .................................................. 297/340, 316
See application file for complete search history.

(56) References Cited

U.S. PATENT DOCUMENTS

| | | |
|---|---|---|
| 2,797,739 A | 7/1957 | Orsini |
| 3,451,261 A | 6/1969 | Olsen |
| 4,045,082 A | 8/1977 | Egert et al. |
| 4,106,081 A | 8/1978 | Turturici |
| 4,272,119 A | 6/1981 | Adams |
| 4,506,317 A | 3/1985 | Duddy |
| 4,626,028 A | 12/1986 | Hatsutta et al. |
| 4,709,961 A | 12/1987 | Hill |
| 4,765,679 A * | 8/1988 | Lanuzzi ............. A47C 1/03255 297/300.3 |
| 4,809,897 A | 3/1989 | Wright, Jr. |
| 4,832,400 A | 5/1989 | Aoki et al. |
| 4,955,571 A | 9/1990 | Lorence et al. |
| 4,977,973 A | 12/1990 | Takizawa |
| 5,003,240 A | 3/1991 | Ikeda |
| 5,011,225 A | 4/1991 | Nemoto |
| 5,011,226 A | 4/1991 | Ikeda et al. |
| 5,015,026 A | 5/1991 | Mouri |
| 5,046,433 A | 9/1991 | Kramer et al. |
| 5,058,953 A | 10/1991 | Takagi et al. |
| 5,092,507 A | 3/1992 | Szablak et al. |
| 5,145,233 A | 9/1992 | Nagashima |
| 5,297,010 A | 3/1994 | Camarota et al. |
| 5,364,164 A | 11/1994 | Kuranami |
| 5,370,035 A | 12/1994 | Madden, Jr. |
| 5,454,624 A * | 10/1995 | Anglade ............... B60N 2/0292 297/321 |
| 5,511,842 A | 4/1996 | Dillon |
| 5,521,806 A | 5/1996 | Hutzel et al. |
| 5,567,011 A | 10/1996 | Sessini |
| 5,732,994 A | 3/1998 | Stancu et al. |
| 5,836,648 A | 11/1998 | Karschin |
| 5,845,965 A | 12/1998 | Heath et al. |
| 6,015,198 A | 1/2000 | Stair |
| 6,032,587 A | 3/2000 | Salenbauch et al. |
| 6,090,148 A | 7/2000 | Weber et al. |
| 6,096,086 A | 8/2000 | Weber et al. |
| 6,110,216 A | 8/2000 | Weber et al. |
| 6,123,377 A | 9/2000 | Lecher et al. |
| 6,135,558 A | 10/2000 | Behrens et al. |
| 6,135,561 A | 10/2000 | Kruger et al. |
| 6,183,033 B1 | 2/2001 | Arai et al. |
| 6,213,549 B1 | 4/2001 | Weiclawski |
| 6,220,660 B1 | 4/2001 | Bedro et al. |
| 6,273,511 B1 | 8/2001 | Wieclawski |
| 6,347,590 B1 | 2/2002 | D'Annunzio et al. |
| 6,419,314 B1 | 7/2002 | Scheerhorn |
| 6,439,636 B1 | 8/2002 | Kuo |
| 6,478,373 B1 | 11/2002 | Hake et al. |
| 6,547,323 B1 | 4/2003 | Aitken et al. |
| 6,565,150 B2 | 5/2003 | Fischer et al. |
| 6,565,153 B2 | 5/2003 | Hensel et al. |
| 6,601,901 B1 | 8/2003 | Schambre et al. |
| 6,719,343 B2 | 4/2004 | Emerling et al. |
| 6,719,367 B2 | 4/2004 | Mic et al. |
| 6,719,368 B1 | 4/2004 | Neale |
| 6,746,065 B1 | 6/2004 | Chan |
| 6,761,388 B2 | 7/2004 | Lein et al. |
| 6,848,817 B2 | 2/2005 | Bos et al. |
| 7,021,694 B1 | 4/2006 | Roberts et al. |
| 7,025,420 B2 | 4/2006 | Guinea Pena et al. |
| 7,055,904 B2 | 6/2006 | Skelly et al. |
| 7,077,472 B2 | 7/2006 | Steffens, Jr. |
| 7,080,865 B2 | 7/2006 | Bergeron et al. |
| 7,114,755 B1 | 10/2006 | Sturt et al. |
| 7,192,070 B2 | 3/2007 | Radu et al. |
| 7,270,452 B2 | 9/2007 | Wang |
| 7,278,681 B2 | 10/2007 | Lilov et al. |
| 7,293,507 B2 | 11/2007 | Depue et al. |
| 7,296,839 B2 | 11/2007 | Scheerhorn |
| 7,322,646 B2 | 1/2008 | Jammalamadaka et al. |
| 7,328,818 B2 | 2/2008 | Prabucki |
| 7,364,231 B2 | 4/2008 | Park et al. |
| 7,393,052 B2 | 7/2008 | Humer et al. |
| 7,431,365 B2 | 10/2008 | Sturt et al. |
| 7,441,838 B2 | 10/2008 | Patwardhan |
| 7,455,016 B2 | 11/2008 | Perin |
| 7,520,552 B2 | 4/2009 | Nakamura et al. |
| 7,523,888 B2 | 4/2009 | Ferry et al. |
| 7,537,364 B2 | 5/2009 | Misawa et al. |
| 7,641,252 B2 | 1/2010 | Sturt et al. |
| 7,644,982 B2 | 1/2010 | Paluch |
| 7,748,762 B2 | 7/2010 | Mayne, Jr. |
| 7,770,953 B2 | 8/2010 | Koarai |
| 7,793,597 B2 | 9/2010 | Bart et al. |
| 7,798,072 B2 | 9/2010 | Becker et al. |
| 7,834,750 B1 | 11/2010 | Hertze et al. |
| 7,645,729 B2 | 12/2010 | Yamada et al. |
| 7,845,729 B2 | 12/2010 | Yamada et al. |
| 7,857,381 B2 | 12/2010 | Humer et al. |
| 7,891,696 B2 | 2/2011 | Hanson |
| 7,934,762 B2 | 5/2011 | Hollenbeck et al. |
| 8,002,323 B2 | 8/2011 | Jones et al. |
| 8,033,610 B2 | 10/2011 | Graber et al. |
| 8,052,194 B2 | 11/2011 | Sayama |
| 8,104,836 B2 | 1/2012 | Little |
| 8,109,565 B2 | 2/2012 | Waters et al. |
| 8,141,930 B2 | 3/2012 | Sayama |
| 8,167,366 B2 | 5/2012 | Charpentier et al. |
| 8,177,281 B2 | 5/2012 | Sayama |
| 8,201,890 B1 | 6/2012 | Nagoaka |
| 8,262,164 B2 | 9/2012 | Ito |
| 8,287,024 B2 | 10/2012 | Sayama |
| 8,287,037 B2 | 10/2012 | Sayama |
| 8,336,955 B2 | 12/2012 | Sayama |
| 8,388,054 B2 | 3/2013 | Sayama |
| 8,397,963 B2 | 3/2013 | Singh |
| 8,421,407 B2 | 4/2013 | Johnson |
| 8,449,029 B2 | 5/2013 | Runde |
| 8,452,838 B2 | 5/2013 | Ono et al. |
| 8,496,295 B2 | 7/2013 | Chen |
| 8,528,978 B2 | 9/2013 | Purpura et al. |
| 8,534,750 B2 | 9/2013 | Sayama |
| 8,540,308 B2 | 9/2013 | Aoki et al. |
| 8,699,683 B1 | 12/2014 | Ito |
| 8,899,683 B2 | 12/2014 | Ito |
| 8,998,327 B2 | 4/2015 | Cooney |
| 9,105,809 B2 | 8/2015 | Lofy |
| 9,150,152 B2 | 10/2015 | Sura et al. |
| 9,168,850 B2 | 10/2015 | Meszaros et al. |
| 9,187,019 B2 | 11/2015 | Dry et al. |
| 9,205,774 B2 | 12/2015 | Kennemer et al. |
| 9,399,418 B2 | 7/2016 | Line et al. |
| 9,421,894 B2 | 8/2016 | Line et al. |
| 9,566,888 B2 | 2/2017 | Kolich et al. |
| 9,573,502 B2 | 2/2017 | Seki et al. |
| 9,596,940 B2 | 3/2017 | Petzel et al. |
| 9,610,872 B2 | 4/2017 | Dry et al. |
| 9,649,962 B2 | 5/2017 | Line et al. |
| 2004/0012234 A1 | 1/2004 | Yamaguchi et al. |
| 2004/0070240 A1 | 4/2004 | Haland et al. |
| 2005/0017561 A1 | 1/2005 | Burmeister, III et al. |
| 2005/0120477 A1 | 6/2005 | Kennan |
| 2005/0173959 A1 * | 8/2005 | Kuebler ............... B60N 2/0232 297/316 |

(56) References Cited

U.S. PATENT DOCUMENTS

| | | |
|---|---|---|
| 2005/0225145 A1 | 10/2005 | Furtado et al. |
| 2005/0280296 A1 | 12/2005 | Ohchi et al. |
| 2006/0006709 A1 | 1/2006 | Uno et al. |
| 2006/0071517 A1 | 4/2006 | Humer et al. |
| 2006/0100764 A1 | 5/2006 | Adams et al. |
| 2006/0202524 A1 | 9/2006 | Yamaguchi |
| 2006/0202525 A1 | 9/2006 | Yamaguchi et al. |
| 2006/0208517 A1 | 9/2006 | Nakamura et al. |
| 2007/0170281 A1 | 7/2007 | Cooper et al. |
| 2007/0205622 A1 | 9/2007 | Whitens et al. |
| 2008/0012402 A1 | 1/2008 | Sekida |
| 2008/0073950 A1 | 3/2008 | Ko |
| 2008/0084098 A1 | 4/2008 | Humer et al. |
| 2008/0088158 A1 | 4/2008 | Yokota et al. |
| 2008/0110931 A1 | 5/2008 | Prabucki |
| 2008/0129093 A1 | 6/2008 | Kim |
| 2008/0231067 A1 | 9/2008 | Nagle |
| 2009/0001795 A1* | 1/2009 | Homier .................... B60N 2/22 297/341 |
| 2009/0167066 A1 | 7/2009 | Mori et al. |
| 2009/0174206 A1 | 7/2009 | Vander Sluis et al. |
| 2009/0309398 A1 | 12/2009 | Niitsuma et al. |
| 2010/0026060 A1 | 2/2010 | Niitsuma et al. |
| 2010/0066135 A1 | 3/2010 | Humer et al. |
| 2010/0066136 A1 | 3/2010 | D'Agostini |
| 2010/0090505 A1 | 4/2010 | Tarusawa et al. |
| 2010/0127540 A1 | 5/2010 | Park et al. |
| 2010/0148545 A1 | 6/2010 | Omori |
| 2010/0187875 A1 | 7/2010 | Sasaki et al. |
| 2010/0201167 A1 | 8/2010 | Wieclawski |
| 2010/0207414 A1 | 8/2010 | Tsuda et al. |
| 2010/0244478 A1 | 9/2010 | Depue |
| 2010/0264704 A1 | 10/2010 | Yasuda et al. |
| 2010/0270834 A1 | 10/2010 | Niitsuma |
| 2010/0270835 A1 | 10/2010 | Nitsuma |
| 2010/0295348 A1 | 11/2010 | Takayasu et al. |
| 2010/0308629 A1 | 12/2010 | Lee et al. |
| 2011/0187167 A1 | 8/2011 | Takayasu et al. |
| 2011/0272978 A1 | 11/2011 | Nitsuma |
| 2012/0068517 A1 | 3/2012 | Yetukuri et al. |
| 2012/0198616 A1 | 8/2012 | Makansi et al. |
| 2012/0212016 A1 | 8/2012 | Kanda |
| 2013/0153055 A1 | 6/2013 | Gaffoglio |
| 2014/0203615 A1 | 7/2014 | Little |
| 2014/0368015 A1 | 12/2014 | Basters et al. |
| 2016/0355114 A1 | 12/2016 | Line et al. |

FOREIGN PATENT DOCUMENTS

| | | |
|---|---|---|
| EP | 2769904 A1 | 8/2014 |
| FR | 2833220 A1 | 10/1938 |
| FR | 2698594 A1 | 6/1994 |
| JP | H07475608 A1 | 3/1995 |
| WO | 2006067460 A1 | 6/2006 |
| WO | 20100144420 A1 | 12/2010 |
| WO | 2016070052 A1 | 5/2016 |

* cited by examiner

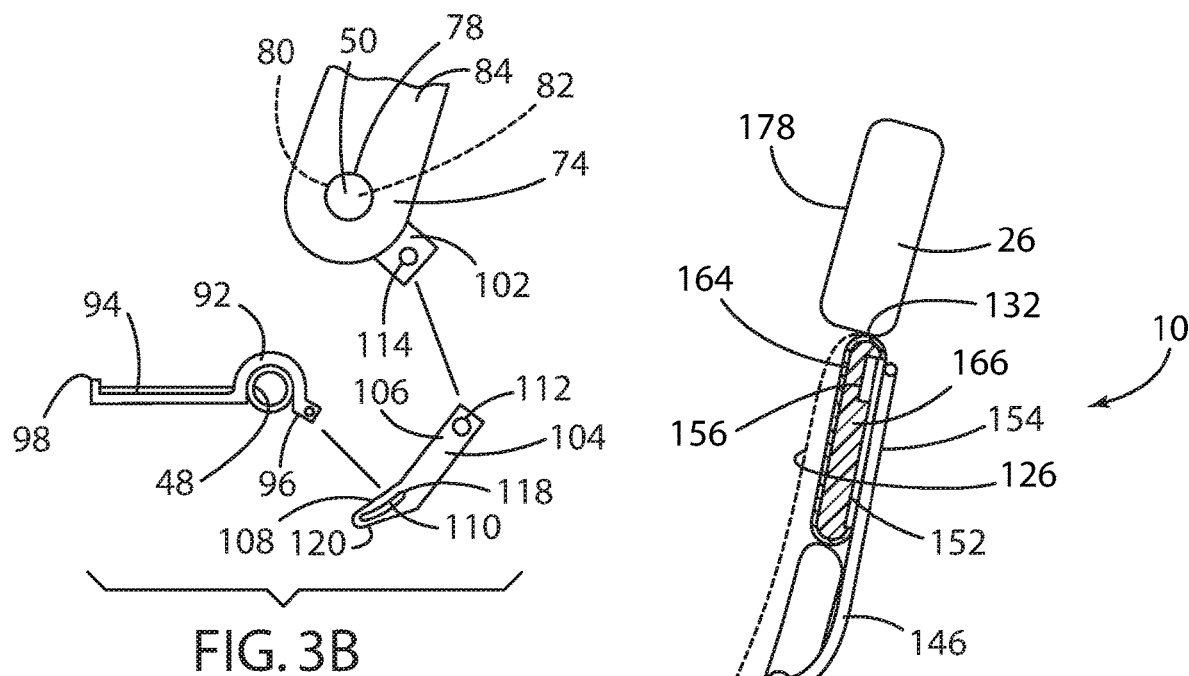
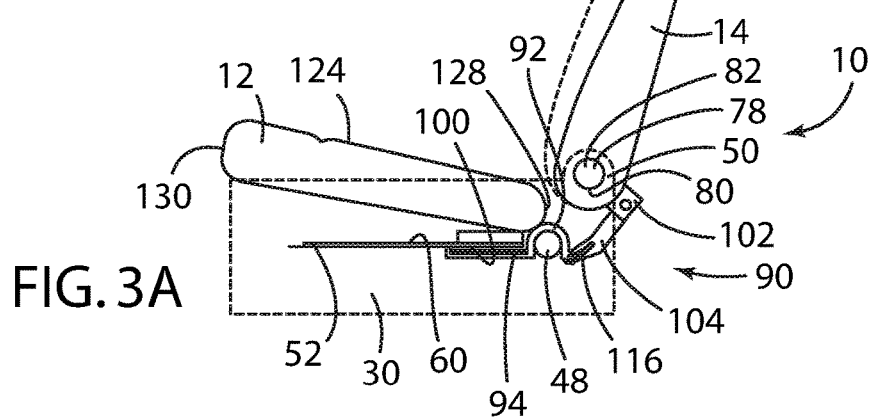
FIG. 3B
FIG. 3A
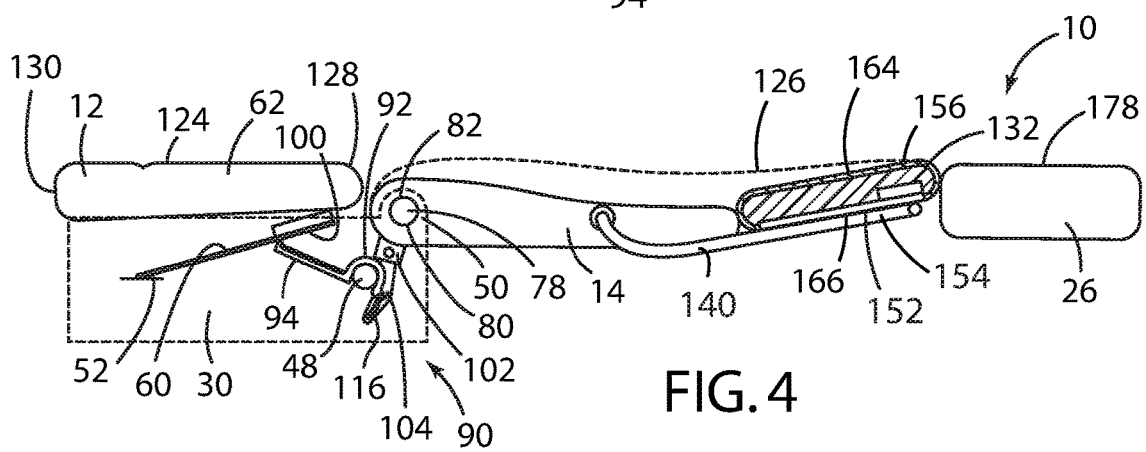
FIG. 4

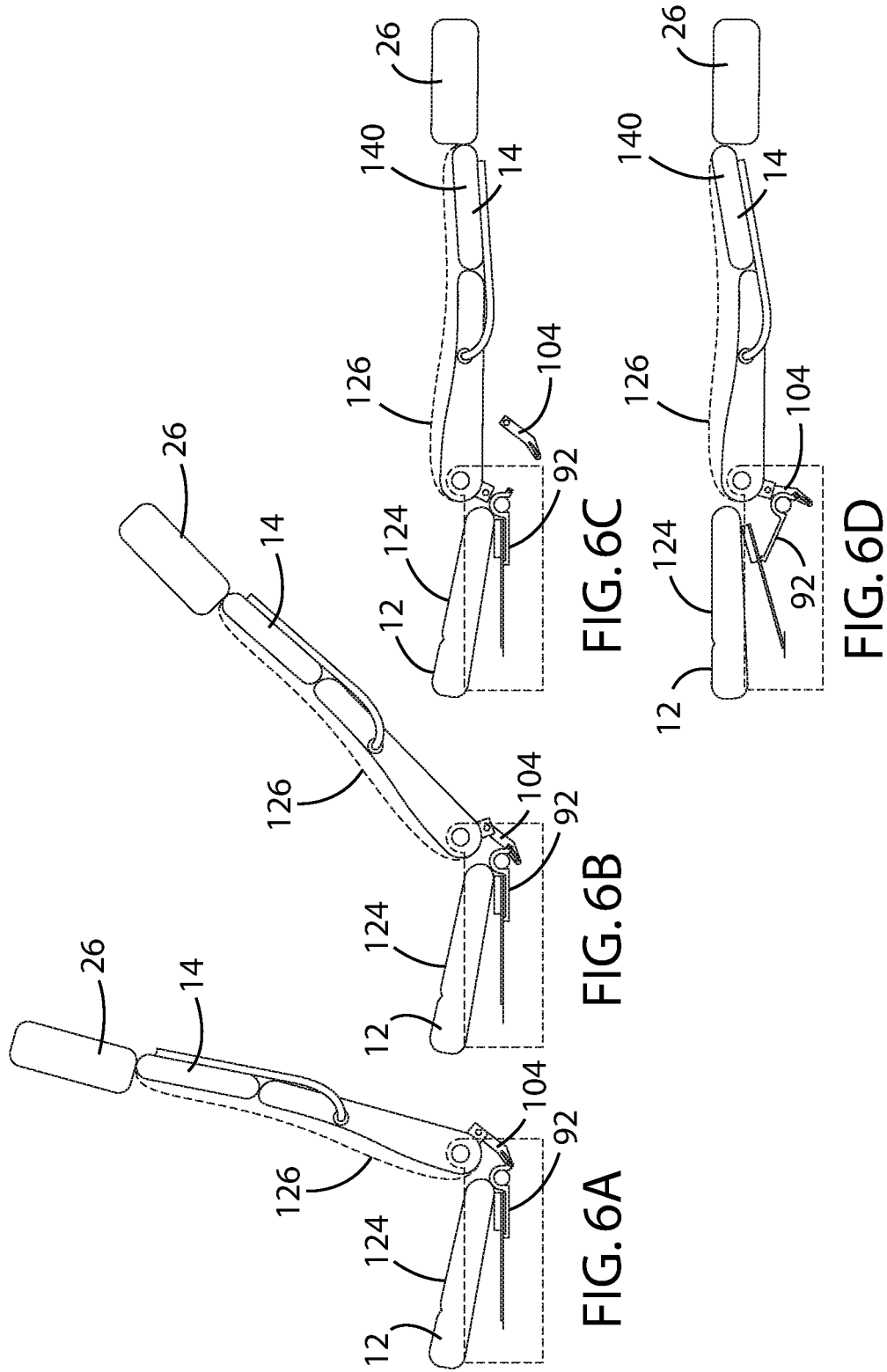

MECHANISM FOR A SUPINE MOTOR VEHICLE SEATING ASSEMBLY

FIELD OF THE INVENTION

The present invention generally relates to an apparatus and method for providing a motor vehicle seating assembly adapted to assume a first configuration to provide conventional support and restraint in the operation of motor vehicle, and adapted to assume a second configuration to provide a relatively level supine platform upon which an occupant might lie when the motor vehicle is not in operation and, more particularly, to a hip lift mechanism that lifts the rear edge of the lower seating structure to the level of the seatback when in the fully reclined position.

BACKGROUND OF THE INVENTION

Motor vehicle seating assemblies provided in modern motor vehicles are primarily designed to provide a support platform designed to accommodate a motor vehicle occupant in a sitting or reclined position, providing support for the motor vehicle occupant's back by which the motor vehicle occupant can safely operate the motor vehicle or travel within the motor vehicle in a comfortable and pleasant manner. Another function of motor vehicle seating assemblies is to assist in restraining the occupant in the event of an impact or rollover event. For example, in the case of a frontal impact event, the motor vehicle seating assembly is particularly adapted to restrain the occupant within a prescribed range of positions so that the motor vehicle's active and passive restraint systems can operate appropriately.

In the case of the lower seating structure of the motor vehicle seating assembly, the lower seating structure is typically downwardly inclined in a rearward direction toward the bite line of the motor vehicle seating assembly to provide an ergonomic seating platform. This configuration also serves to assist in positioning the H-point of the motor vehicle occupant of the motor vehicle seating assembly, whereby in the event of a frontal impact event, the forward momentum of the motor vehicle occupant generates a force against the lower seating assembly, which tends to retain the motor vehicle occupant in a position, where the active restraint system comprising the seatbelt assembly and the passive restraint system comprising one or more airbags can be most effectively employed.

However, modern motor vehicle seating assemblies typically do not address the needs of motor vehicle occupants when the vehicle is parked and the motor vehicle occupant wants to rest or sleep. Due to the mechanisms widely in use to provide a seatback recline feature, the seatback may cause significant discomfort when it moves from a driving/use design position to a resting/sleeping position. In particular, existing reclining features tend to create a substantial vertical gap between the lower seating structure and the seatback with the seatback in the fully reclined position. Likewise, the seatback often fails to provide sufficient upper back support when in the fully reclined position. Features are needed to make the motor vehicle occupant more comfortable and relaxed. Mechanisms that provide a relatively level supine platform and adequate upper back support are desired.

SUMMARY OF THE INVENTION

According to one aspect of the present invention, a seating assembly for a motor vehicle has a lifter mechanism for an edge of a seat cushion comprising a bracket pivotable about a transverse bar, the bracket comprising a forward lever and a rearward lever, and a link pinned at a first end to a seatback and pinned at a second end to the rearward lever via a slot, wherein the forward lever raises the edge upon the seatback pivoting to a predetermined reclined position.

Embodiments of the first aspect of the invention can include any one or a combination of the following features:

- an exposed surface on each of the seat cushion and the seatback substantially occupying the same horizontally plane when the seatback is in a fully reclined position;
- an upper end and a lower end and the rearward lever of the bracket comprises a pin received within the slot, wherein the lower end of the slot being proximate with the pin corresponds to an upright position of the seatback and wherein the upper end of the slot being in initial contact with the pin corresponds to the predetermined reclined position between the upright position and the fully reclined position;
- a seatback pivotable between the predetermined reclined position and when in the fully reclined position urging the upper end of the slot against the pin to rotate the bracket and raise the forward lever and the edge of the seat cushion upwardly;
- a seatback where the predetermined reclined position is about 55.5° relative a vertical plane;
- a lower seating structure having a forward seat pan, a pair of opposed lateral lower seat frame members having forward and rearward ends attached to opposed lateral edges of the forward seat pan at the forward ends of the opposed lateral lower seat frame members, a pivot bar laterally extending between the rearward ends of the lateral lower seat frame members, a lower seat pivot mount disposed at the rearward end of the opposed lateral lower seat frame members, a cushion suspension system attached to the forward seat pan and adjustably supported between the pair of opposed lateral lower seat frame members, and a cushion assembly supported by the cushion suspension system; and a seatback pivotable between an upright position and a fully reclined position operably coupled with the lower seating structure, the seatback further comprising a frame having an upper transverse cross member, a lower transverse cross member, and a pair of opposed lateral seatback frame members extending between the upper and lower transverse members, wherein each of the pair of opposed lateral seatback frame members has a seatback pivot mount at a lower portion thereof that is operably coupled with the lower seat pivot mount; wherein the bracket of the lifter mechanism is operably coupled with and pivotally disposed relative the transverse bar and the lifter mechanism further comprises a frame attachment bracket operably coupled with a lower portion of the frame of the seatback and the link is pivotally attached to the frame attachment bracket at the first end and is pivotally attached to the rearward lever of the bracket at the second end, and the link comprises the slot disposed proximate the second end operably coupled with the rearward lever of the bracket, wherein the forward lever of the bracket raises the cushion suspension system upwardly upon the seatback pivoting to a predetermined reclined position between the upright position and the fully reclined position;
- a forward lever that acting against a lower surface of the cushion suspension system;

a cushion suspension system having a pair of lateral opposed suspension frame members and a suspension cross member extending between the pair of lateral opposed suspension frame members, the pair of lateral opposed suspension frame members and the suspension cross member of the cushion suspension system comprising an upper surface in contact with the cushion assembly and at least one of the pair of opposed suspension frame members comprise the lower surface of the cushion suspension system;

a cushion suspension system having a plurality of resilient members extending between the pair of lateral opposed suspension frame members;

a forward portion of the plurality of resilient members pivotally attached to the forward seat pan of the lower seating structure;

a slot of the link having an upper end and a lower end and the rearward lever of the bracket comprises a pin received within the slot, wherein the lower end of the slot being proximate with the pin corresponds to the upright position of the seatback and wherein the upper end of the slot being in initial contact with the pin corresponds to the predetermined reclined position between the upright position and the fully reclined position;

a pair of lifter mechanisms disposed proximate one of the pair of opposed lateral lower seat frame members;

forward levers of each of the pair of brackets laterally disposed between the pair of opposed lateral lower seat frame members and beneath one of the pair of lateral opposed suspension frame members; and forward lever of the hip lifter pivot bracket comprising a glide surface slidably engaging a lower surface of the cushion suspension system.

According to another aspect of the present invention, a seating assembly for a motor vehicle comprises a lower seating structure further comprising a forward seat pan, a pair of opposed lateral lower seat frame members having forward and rearward ends attached to opposed lateral edges of the forward seat pan at the forward ends of the opposed lateral lower seat frame members, a pivot bar laterally extending between the rearward ends of the lateral lower seat frame members, a lower seat pivot mount disposed at the rearward end of the opposed lateral lower seat frame members, a cushion suspension system attached to the forward seat pan and adjustably supported between the pair of opposed lateral lower seat frame members, and a cushion assembly supported by the cushion suspension system. The seating structure further comprises a seatback pivotable between an upright position and a fully reclined position operably coupled with the lower seating structure, the seatback further comprising a frame having an upper transverse cross member, a lower transverse cross member, and a pair of opposed lateral seatback frame members extending between the upper and lower transverse members, wherein each of the pair of opposed lateral seatback frame members has a seatback pivot mount at a lower portion thereof that is operably coupled with the lower seat pivot mount; and a hip lifter mechanism further comprising a hip lifter pivot bracket operably coupled with and pivotally disposed relative the pivot bar, the hip lifter pivot bracket comprising a forward lever and a rearward lever, a frame attachment bracket operably coupled with a lower portion of the frame of the seatback, and a link pivotally attached to the frame attachment bracket at a first end and pivotally attached to the rearward lever of the hip lifter pivot bracket at a second end, the link having a slot proximate the second end operably coupled with the rearward lever of the hip lifter pivot bracket, wherein the forward lever of the hip lifter pivot bracket raises the cushion suspension system upwardly upon the seatback pivoting to a predetermined reclined position between the upright position and the fully reclined position.

According to yet another aspect of the present invention, a seat assembly forming a substantially horizontal plane for an exposed surface of each of a lower seat cushion and a seatback cushion of a seatback comprises a lifter mechanism for a rearward edge of the lower seat cushion. The lifter mechanism comprises a bracket pivotable about a transverse bar fixedly mounted to a frame assembly for a lower seat assembly, the bracket comprising a forward lever and a rearward lever; and a link pinned at a first end to the seatback and pinned at a second end to the rearward lever by a slot. The rearward edge of the lower seat cushion is initially raised by the forward lever upon the seatback pivoting to a predetermined reclined position and the rearward edge of the lower seat cushion is raised to the substantially horizontal plane upon the seatback pivoting to a fully reclined position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3A is a side view of the hip lifter mechanism of the automotive seat assembly of FIG. 1, wherein the seatback is in the upright position and the upper back support is in its stowed position;

FIG. 3B is a side schematic view of the hip lifter mechanism of the automotive seat assembly of FIG. 1, wherein the seatback is in the upright position;

FIG. 4 is side view of the hip lifter mechanism of the automotive seat assembly of FIG. 1, wherein the seatback is in the fully reclined position and the upper back support is in its fully raised position;

FIG. 6A is a side schematic view of the hip lifter mechanism of the automotive seat assembly of FIG. 1, wherein the seatback is in the upright position;

FIG. 6B is a side schematic view of the hip lifter mechanism of the automotive seat assembly of FIG. 1, wherein the seatback is in the first predetermined position;

FIG. 6C is a side schematic view of the hip lifter mechanism with the link removed and the upper back support in the stowed position of the automotive seat assembly of FIG. 1, wherein the seatback is in the fully reclined position;

FIG. 6D is a schematic side view of the hip lifter mechanism with the link installed and the upper back support in the fully raised position of the automotive seat assembly of FIG. 1, wherein the seatback is in the fully reclined position;

DETAILED DESCRIPTION OF THE PREFERRED EMBODIMENTS

Figure 1:
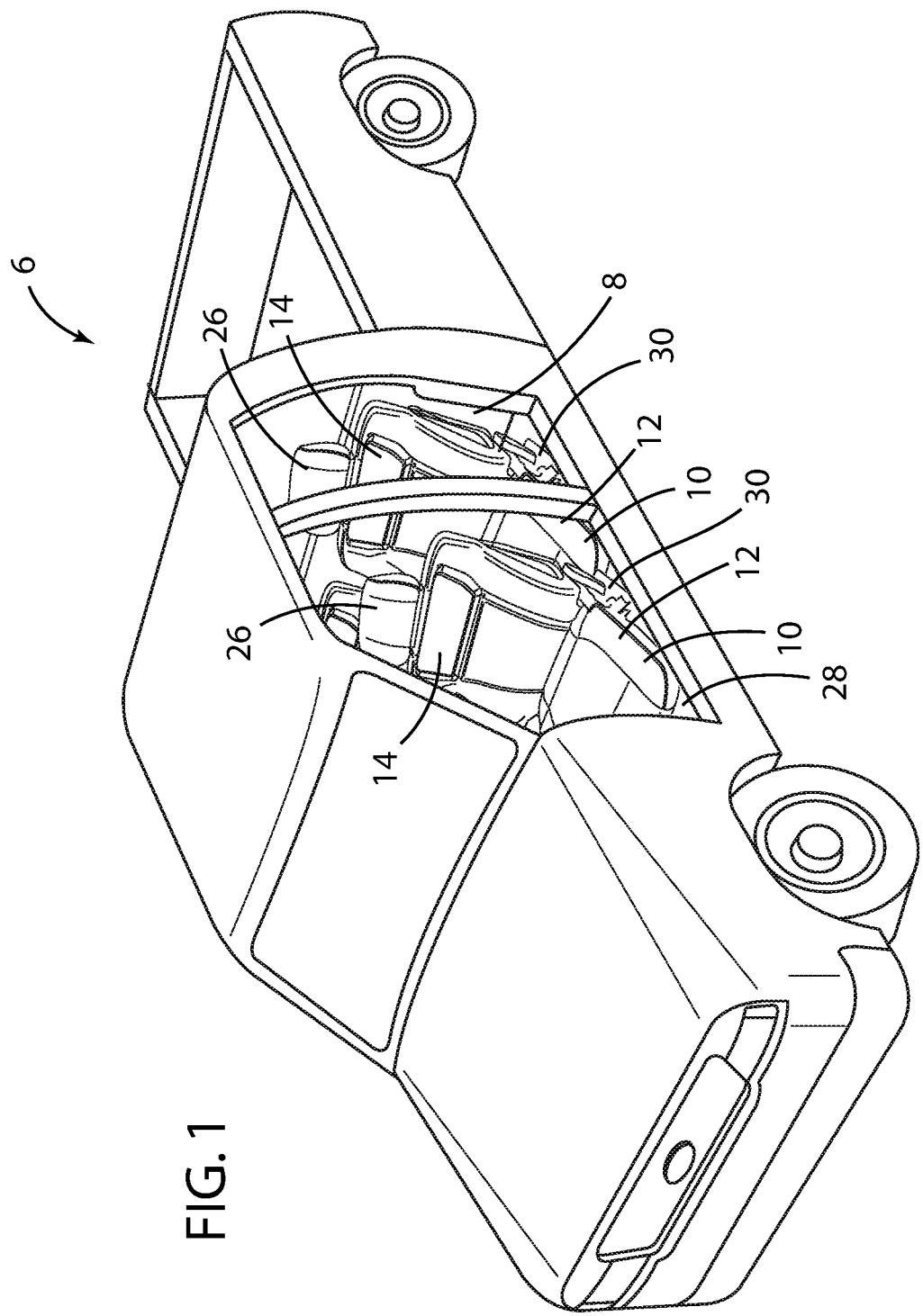
FIG. 1 is a front side perspective view of an automotive seat assembly installed in a motor vehicle in accordance with the present disclosure, wherein the seatback of the front seating assembly is in the upright position.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
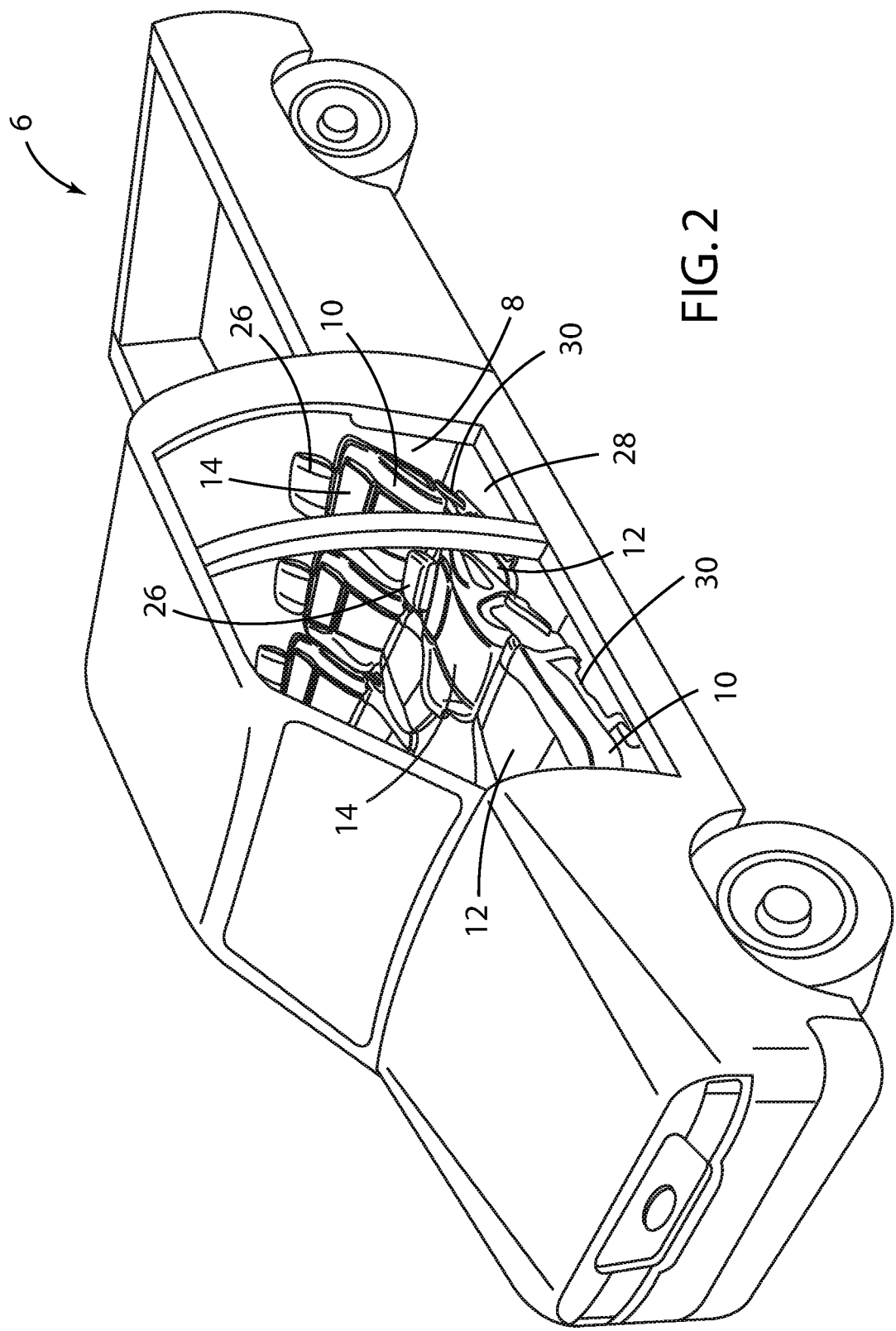
FIG. 2 is a front side perspective view of the automotive seat assembly of FIG. 1, wherein the seatback of the front seating assembly is in the fully reclined position.

Referring to FIGS. 1-4, reference numeral 10 generally designates a vehicle seating assembly for use in a vehicle cabin 8 of a motor vehicle 6. The motor vehicle seating assembly 10 includes a lower seating structure 12 pivotably coupled to a raised seatback 14. As shown in FIGS. 1-2, the motor vehicle seating assembly 10 is generally configured for use in a variety of motor vehicles 6 in a front driver seat, a front passenger seat, or a rear seat of the motor vehicle 6 and generally includes the aforementioned lower seating structure 12 and raised seatback 14. A head restraint 26 is also mounted to the top of the raised seatback 14. The motor vehicle seating assembly 10 may be configured to be mounted on a support surface, such as a floor pan 28 of the vehicle 6. A seat track assembly 30 may be coupled to the lower seating structure 12 to facilitate fore and aft positioning of the motor vehicle seating assembly 10, as is known. The motor vehicle seating assembly 10 is generally designed for the comfort of a motor vehicle occupant, as well as to accommodate and protect the motor vehicle occupant during a collision event.

Figure 7:
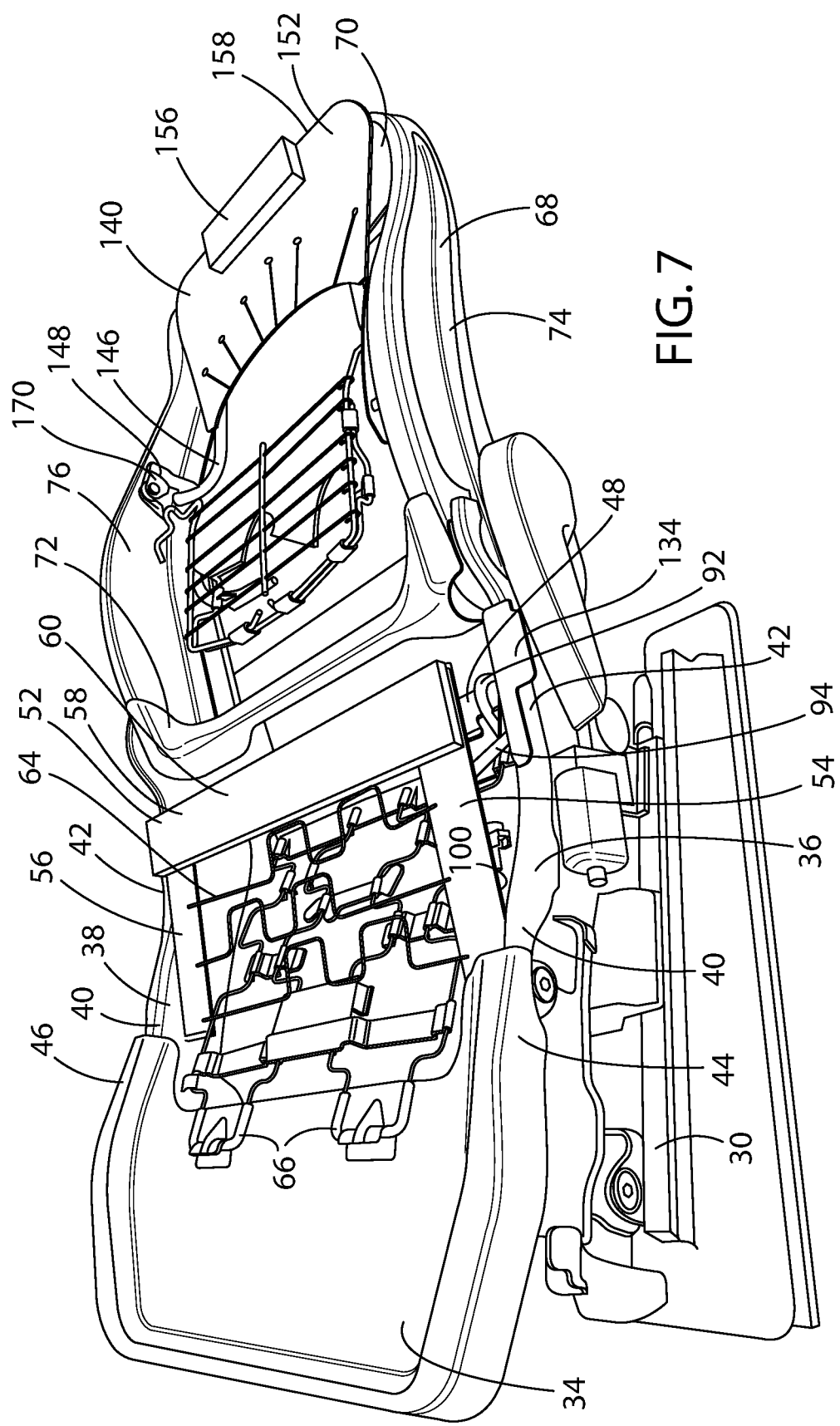
FIG. 7 is a side perspective view of the hip lifter mechanism with the link installed and the upper back support of the automotive seat assembly in the stowed position of FIG. 1, wherein the seatback is in the fully reclined position.

As best shown in FIG. 7, the lower seating structure 12 includes a forward seat pan 34 and a pair of opposed lateral lower seat frame members 36, 38 having forward and rearward ends 40, 42 attached to opposed lateral edges 44, 46 of the forward seat pan 34 at the forward ends 40 of the opposed lateral lower seat frame members 36, 38. A pivot bar 48 extends laterally between and is fixedly attached to the rearward ends 42 of the opposed lateral lower seat frame members 36, 38. Preferably, the forward seat pan 34 and frame members 36, 38 are fabricated from relatively low-weight and high-strength metal components, such as high-strength steel or aluminum. A lower seat pivot mount 50 is mounted at the rearward end 42 of the opposed lateral lower seat frame members 36, 38.

Figure 5:
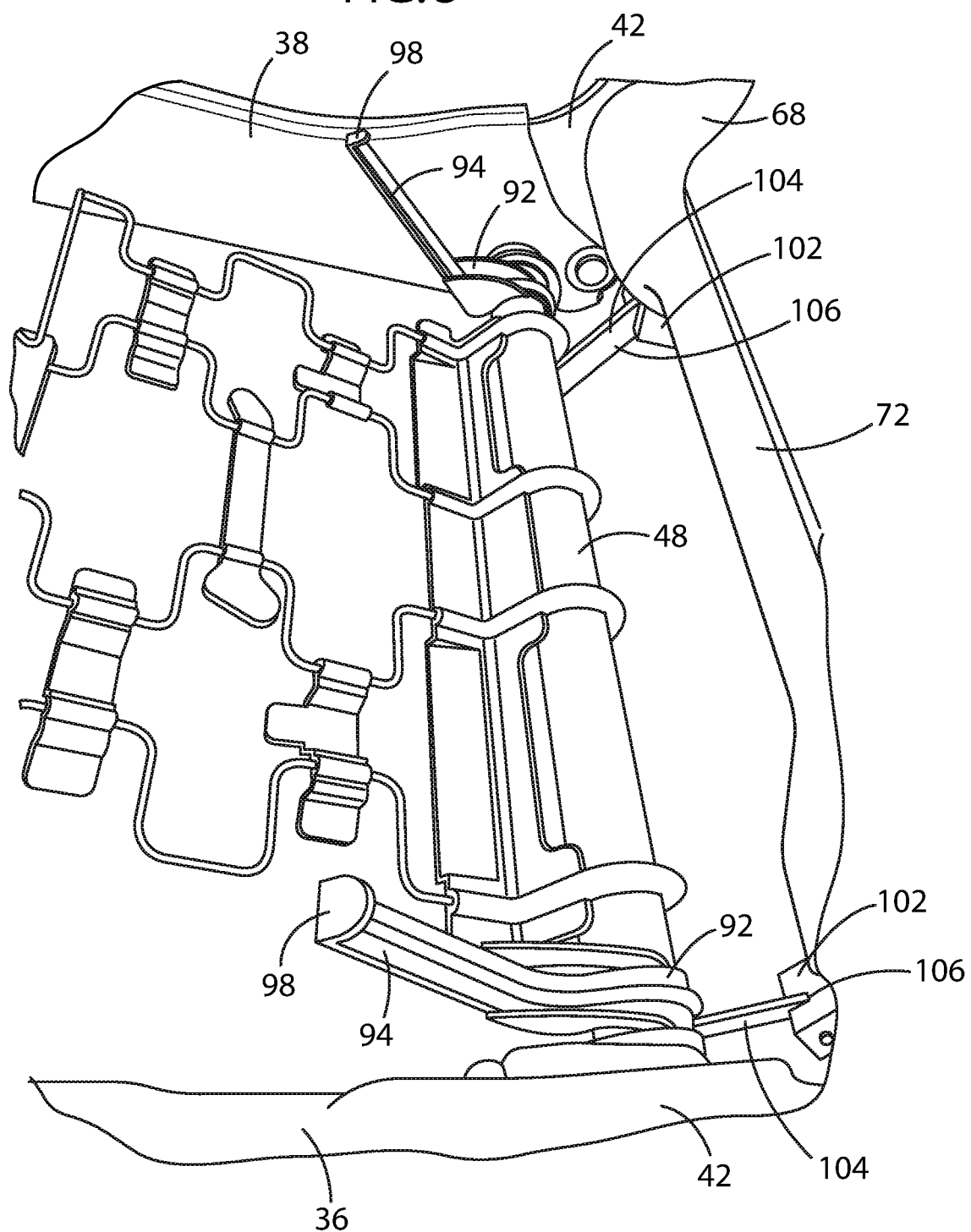
FIG. 5 is a side perspective view of the hip lifter mechanism of the automotive seat assembly of FIG. 1.
Figure 8:
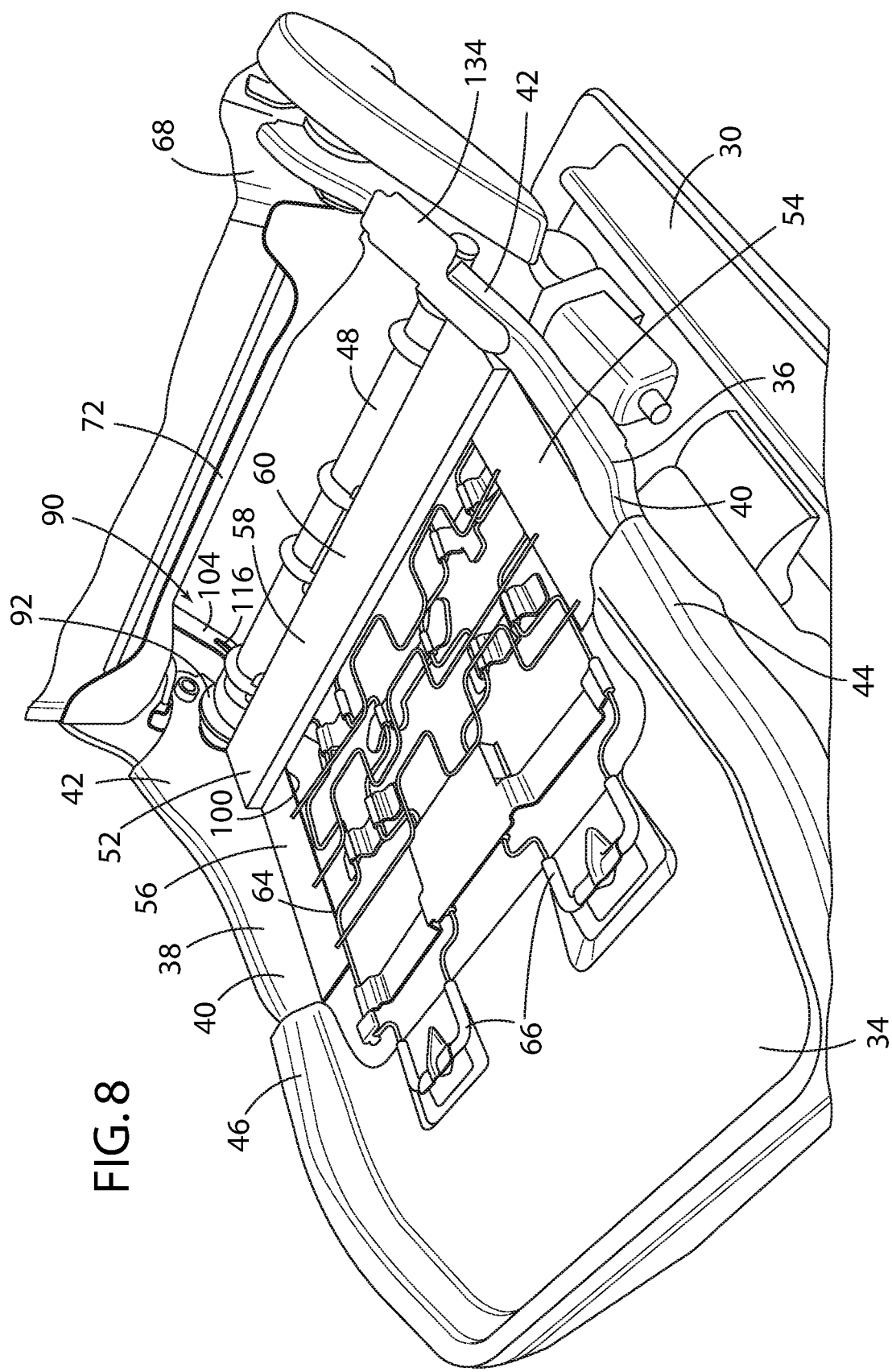
FIG. 8 is a partial front view of the hip lifter mechanism and cushion suspension system of the automotive seat assembly of FIG. 1.

A cushion suspension system 52 is attached to the forward seat pan 34 and adjustably supported between the pair of opposed lateral lower seat frame members 36, 38. The cushion suspension system 52 includes a pair of lateral opposed suspension frame members 54, 56 and a suspension cross member 58 extending between the pair of lateral opposed suspension frame members 54, 56. The pair of lateral opposed suspension frame members 54, 56 and the suspension cross member 58 of the cushion suspension system 52 form an upper surface 60 in contact with and supporting a cushion foam and trim assembly 62. At least one of the pair of opposed suspension frame members 54, 56 form a lower surface 100 of the cushion suspension system 52, as further discussed below. The cushion suspension system 52 further comprises a plurality of resilient members 64, such as bent spring wires, extending between the pair of lateral opposed suspension frame members 54, 56 that provide further support for the cushion foam and trim assembly 62. As shown in FIGS. 5, 7, and 8, a forward portion 66 of the plurality of resilient members 64 are pivotally attached to the forward seat pan 34 of the lower seating structure 12 to allow the cushion suspension system 52 to be raised and lowered, as described below.

As noted above, the seatback 14 is pivotable between an upright position and a fully reclined position and is operably coupled with the lower seating structure 12. The seatback 14 includes a frame 68 having an upper transverse cross member 70, a lower transverse cross member 72, and a pair of opposed lateral seatback frame members 74, 76 vertically extending between the upper and lower transverse cross members 70, 72. Each of the pair of opposed lateral seatback frame members 74, 76 has a seatback pivot mount 78 at a lower portion thereof that is operably coupled with the lower seat pivot mount 50. Preferably, the seatback pivot mounts 78 on each of the pair of opposed lateral seatback frame members 74, 76 comprise a circular recess 80, and the lower seat pivot mount 50 mounted on each of the pair of opposed lateral lower seat frame members 36, 38 comprises a circular projection 82 received within the circular recess 80.

Figure 6:
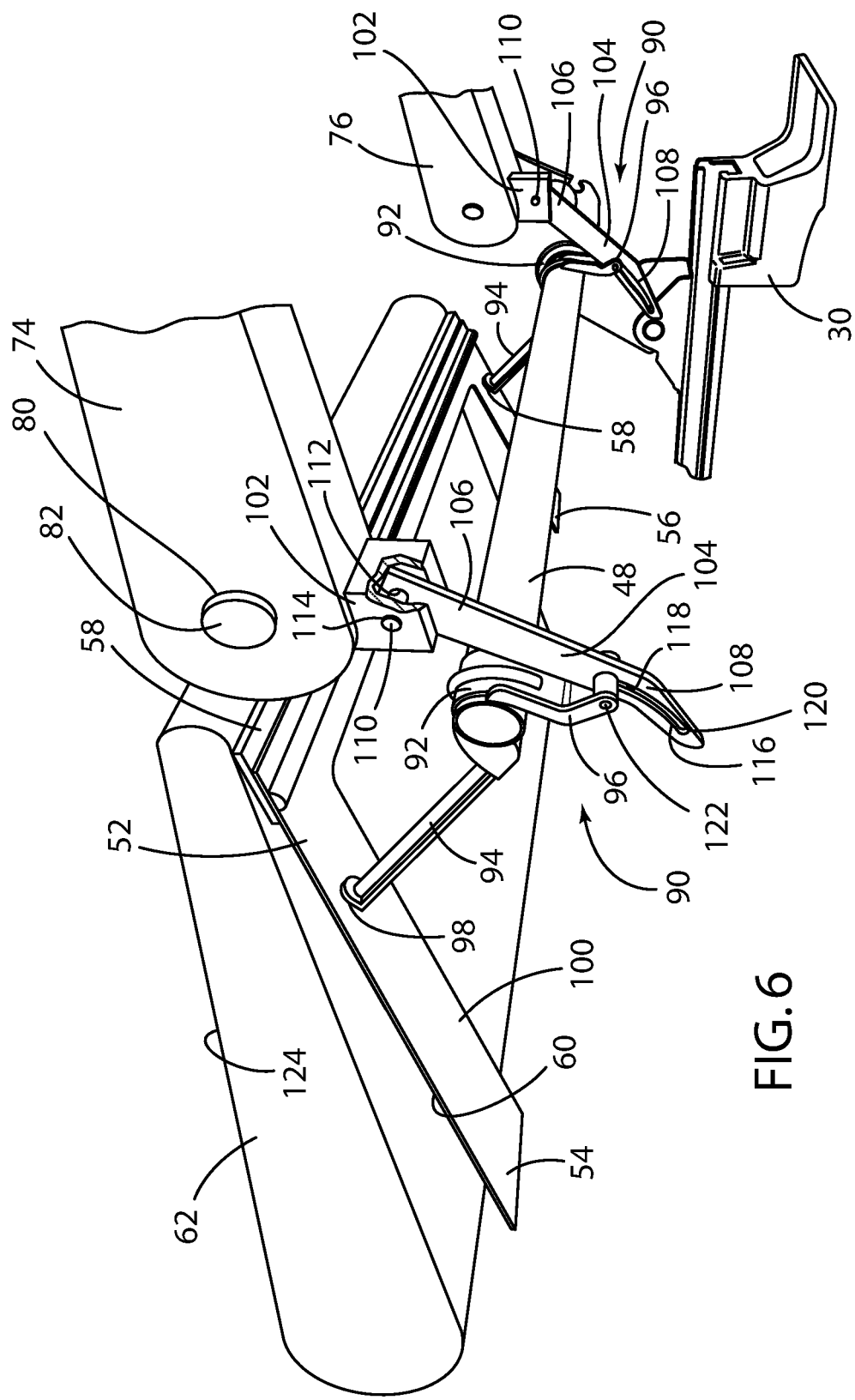
FIG. 6 is a bottom perspective view of the hip lifter mechanism of the automotive seat assembly of FIG. 1, wherein the seatback is in the fully reclined position.

The motor vehicle seating assembly 10 further includes a hip lifter mechanism 90, which comprises a pair of hip lifter pivot brackets 92 operably coupled with and pivotally disposed relative the pivot bar 48. Each of the hip lifter pivot brackets 92 is preferably formed in a U-shape that fits over and is supported by the pivot bar 48 and is similarly fabricated from a lightweight yet strong metallic material. Each of the pair of hip lifter pivot brackets 92 is preferably disposed proximate one of the pair of opposed lateral lower seat frame members 36, 38. As shown in FIGS. 6-6D, each of the hip lifter pivot brackets 92 comprises a forward lever 94 and a rearward lever 96. The forward lever 94 of each of the pair of hip lifter pivot brackets 92 is likewise preferably laterally disposed between the pair of opposed lateral lower seat frame members 36, 38 and beneath one of the pair of lateral opposed suspension frame members 54, 56. So disposed, the forward lever 94 of the hip lifter pivot brackets 92 comprises a glide surface 98 that slidably engages and, upon further rotation, lifts a lower surface 100 of the cushion suspension system 52. It is contemplated that the glide surface 98 may be coated with polytetrofluoride to provide lower friction and reduce wear.

A pair of frame attachment brackets 102 is operably coupled with preferably the lower portions 84 of the opposed lateral seatback frame members 74, 76, as shown in FIGS. 6-6D. Alternatively, the frame attachment brackets 102 may be attached to the lower transverse cross member 72 of the frame 68 of the seatback 14, both preferably by welding. A link 104 is pivotally attached or pinned to each of the frame attachment brackets 102 at a first end 106 and pivotally attached or pinned to the rearward lever 96 of the hip lifter pivot brackets 92 at a second end 108. The pivotable attachment of the first end 106 of the link 104 to the frame attachment bracket 102 is preferably accomplished by a pin 110 secured within an opening 112, 114 in each of the first end 106 of the link 104 and the frame attachment bracket 102, respectively, allowing relative pivotal motion. As shown in FIGS. 6-6D, the link 104 is provided with a slot 116 proximate the second end 108 that is operably coupled with the rearward lever 96 of the hip lifter pivot bracket 92. The slot 116 of the link 104 has an upper end 118 and a lower end 120. The rearward lever 96 of the hip lifter pivot bracket 92 also includes a pin 122 that is received within the slot 116.

In operation, each of the forward levers 94 acts against the lower surface 100 of the cushion suspension system 52. That is, when the seatback 14 is in the upright position, the lower end 120 of the slot 116 is proximate the pin 122 provided in the rearward lever 96, as shown in FIG. 6A. Thus, when the lower end 120 of the slot 116 is proximate with the pin 122, the seatback 14 position corresponds to the upright position of the seatback 14. Similarly, as the seatback 14 is reclined, the upper end 118 of the slot 116 is brought into initial contact with the pin 122 provided in the rearward lever 96, where the seatback 14 position corresponds to a predetermined reclined position between the upright position and the fully reclined position, as shown in FIG. 6B. Preferably, the predetermined reclined position of the seatback 14 is about 55.5° relative a vertical plane. Further rotation of seatback 14 toward the fully reclined position further displaces the rearward lever 96 of the hip lifter pivot bracket 92 downward, which, in turn, rotates the hip lifter pivot bracket 92 and raises the forward lever 94, which then urges upwardly upon the lower surface 100 of the cushion suspension system 52. This action raises the cushion suspension system 52 upwardly upon the seatback pivoting beyond the predetermined reclined position between the upright position and the fully reclined position.

As best shown in FIGS. 3 and 4, each of the lower seating structure 12 and the seatback 14 have an exposed surface 124, 126, respectively. Preferably, the exposed surface 124 comprises a locally flexible/stretch trim material relative to the cushion foam and trim assembly 62 that may be moved in order to keep the trim material and foam of the cushion foam and trim assembly 62 in tension to maintain a flat surface and eliminate wrinkling. In particular, a rear edge 128 of the cushion foam and trim assembly 62 of the lower seating structure 12 is raised by moving the seatback 14 to the fully reclined position, such that the cushion suspension system 52 raises the exposed surface 124 of the seat cushion foam and trim assembly 62 to substantially occupy the same horizontal plane as that of the exposed surface 126 of the seatback 14 when the seatback 14 is in a fully reclined position. This benefit might be most appreciated by comparing the relative exposed surfaces 124, 126 in FIG. 6C, where the link 104 has been removed and the hip lifter mechanism 90 thus disabled, with the relative exposed surfaces 124, 126 shown in FIG. 6D, where the link 104 is installed and the exposed surfaces 124, 126 occupy substantially the same plane.

Figure 9:
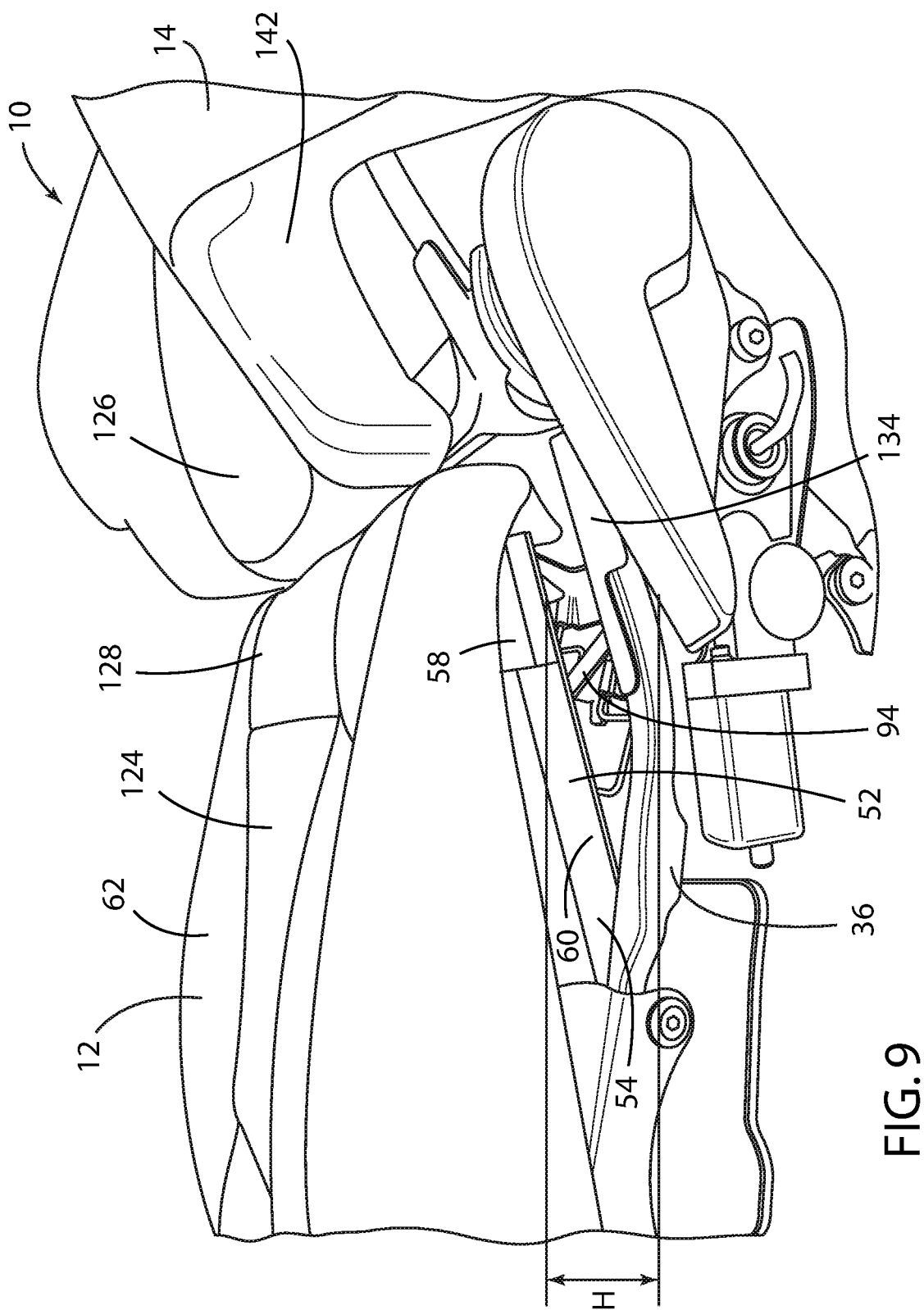
FIG. 9 side perspective view of seating assembly of the automotive seat assembly of FIG. 1.

Preferably, the hip lifter mechanism 90 raises the cushion suspension system 52 and cushion foam and trim assembly 62 a distance H between 45 to 70 mm between the upright position and the fully reclined position of the seatback 14 to eliminate pressure on the lumbar and lifting the occupant's tailbone and hips, as shown in FIG. 9. The result is a substantially planar and continuous surface from the exposed surfaces 124, 126 of the cushion foam and trim assembly 62 and seatback 14, respectively. Preferably, the fully reclined position of the seatback 14 is reached at about 85° from vertical, extending from a front edge 130 of the lower seating structure 12 to an upper portion 132 of the seatback 14.

In addition, the slotted linkage for the hip lifter mechanism 90 provides a passive system that automatically raises the height of the lower seating structure cushion foam and trim assembly 62 once the seatback 14 reaches a desired sleeper initiation angle, here preferably 55.5° from vertical, and achieves maximum lift of the cushion foam and trim assembly 62 once the seatback 14 reaches the maximum sleeper angle, here preferably 85° from vertical. Additional benefits of the hip lifter mechanism 90 disclosed herein is that the forward levers 94 are disposed between the cushion suspension system 52 and the lower seat frame side members 36, 38 so as not to affect the seating assembly H-point or comfort when the seatback 14 of the seating assembly 10 is not in the fully reclined position or sleeper mode. Further, the maximum lift height of the rear edge 128 of the cushion foam and trim assembly 62 of the lower seating structure 12 can be readily modified and tuned to specific applications by relatively simple changes to the system geometry, such as the shape and length of the slot 116.

Further, the hip lifter mechanism 90 represents a relatively simple mechanical system which can be manually actuated and does not require a motor, although a power actuated vehicle seating assembly can likewise beneficially employ the disclosed hip lifter mechanism 90. In addition, existing seatback 14 recline latch controls 134 and associated mechanism can be readily employed to maintain the seatback 14 in the desired reclined position between the upright position and the fully reclined position, while simultaneously providing the lift function for the rear edge 128 of the lower seating structure cushion foam and trim assembly 62 beyond a predetermined reclined position. Finally, the disclosed hip lifter mechanism 90 is readily adaptable as a retrofit device to existing motor vehicle seating assemblies 10.

Thus, to the extent that a motor vehicle occupant desires a supine position to rest when the motor vehicle 6 is not in operation, the aforementioned disclosure provides just such a platform upon which the motor vehicle occupant may rest. In accordance with the aforementioned disclosure, it is now possible to provide a more comfortable sleeping seat surface by raising the height of the rear edge 128 of the cushion foam and trim assembly 62 of the lower seating structure 12 to make the overall surface more level and the transition from the cushion foam and trim assembly 62 to the seatback 14 less noticeable.

Also, additional features can be added to the motor vehicle seating assembly 10 to provide an overall surface that is more level. In particular, the motor vehicle seating assembly 10 described above can further include an upper back support 140 that can be raised above a main body 142 of the seatback 14 within a range of a plurality of positions, between a stowed position and a fully raised position, where a moveable cushion 144 is attached to and disposed above the upper back support 140 to form an exposed surface 162.

Figure 12:
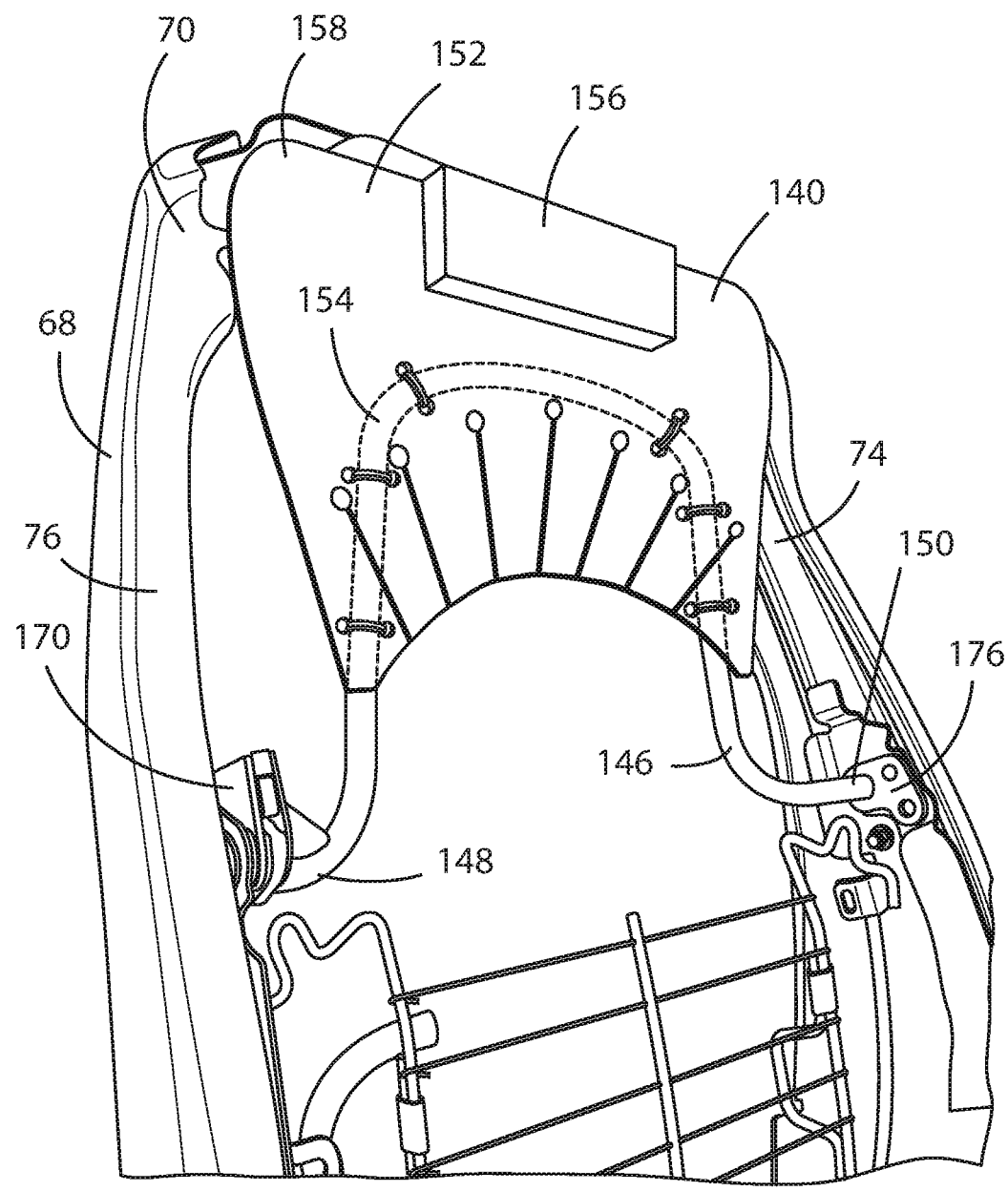
FIG. 12 is a front perspective view of the tubular member and substantially rigid planar base of the upper back support of the automotive seat assembly of FIG. 1 with the upper back support in the stowed position.
Figure 13:
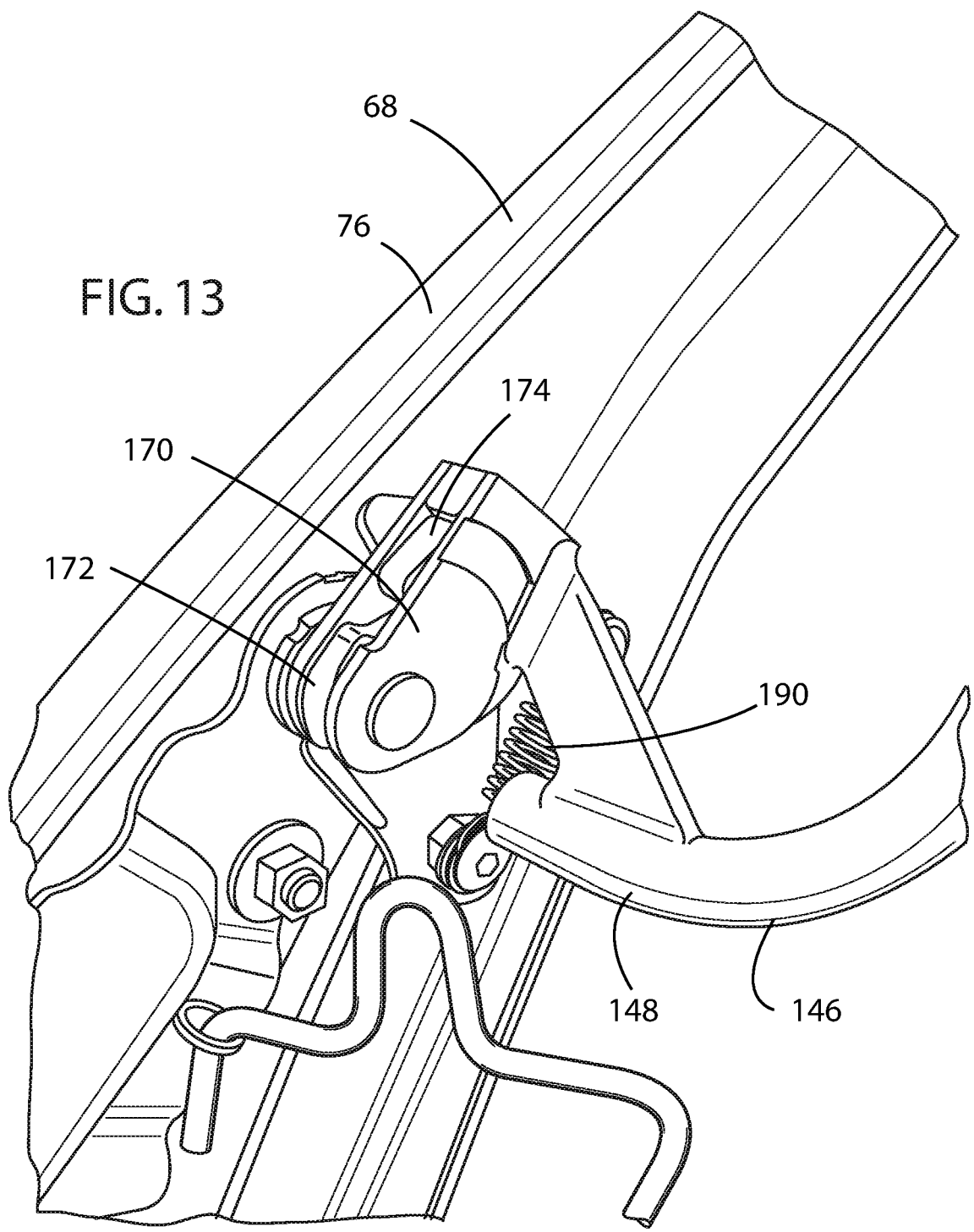
FIG. 13 is a side perspective view of the ratchet latch of the upper back support of the automotive seat assembly of FIG. 1 with the upper back support in the stowed position.
Figure 14:
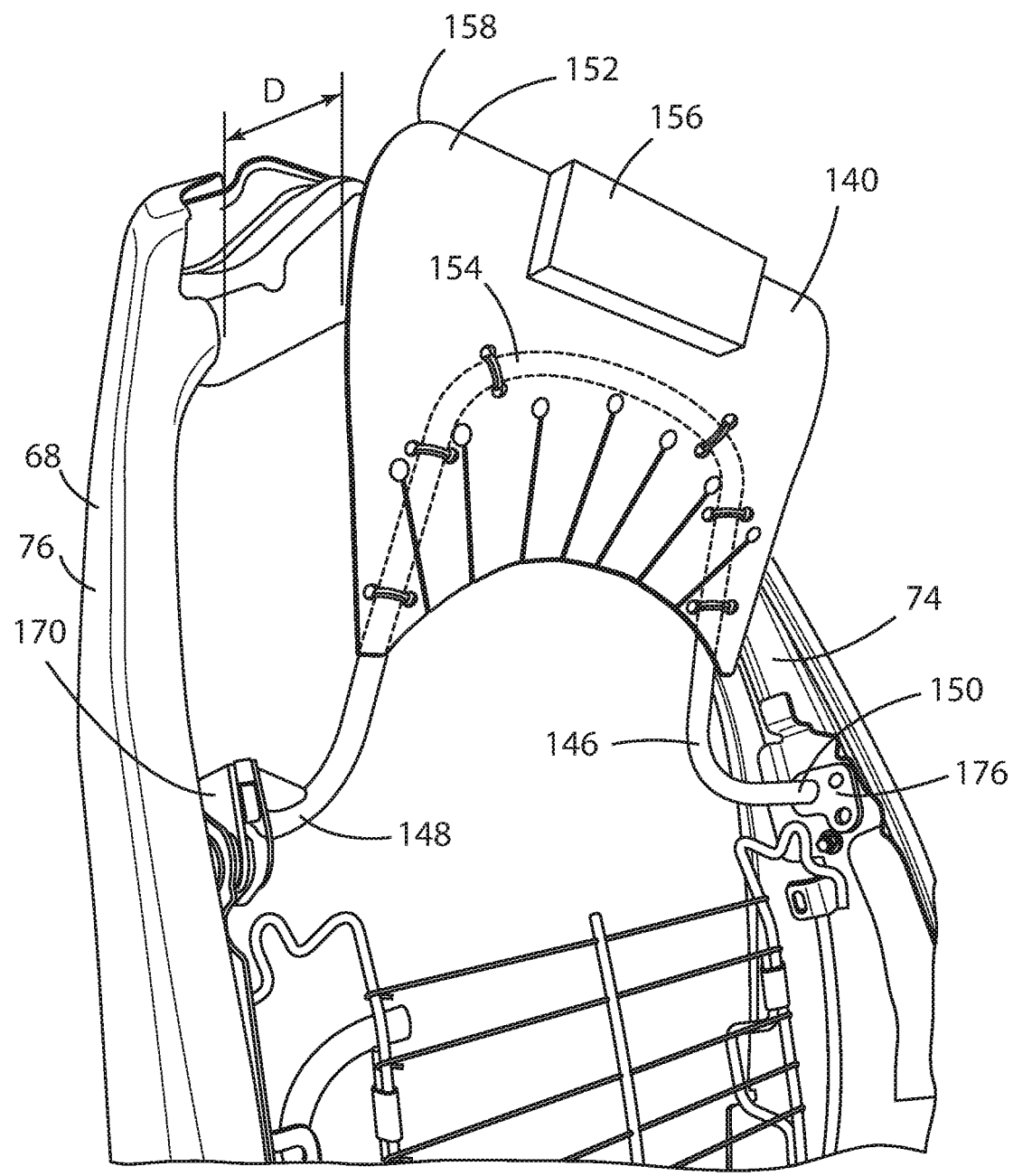
FIG. 14 is a front perspective view of the tubular member and substantially rigid planar base of the upper back support of the automotive seat assembly of FIG. 1 with the upper back support in the fully raised position.
Figure 15:
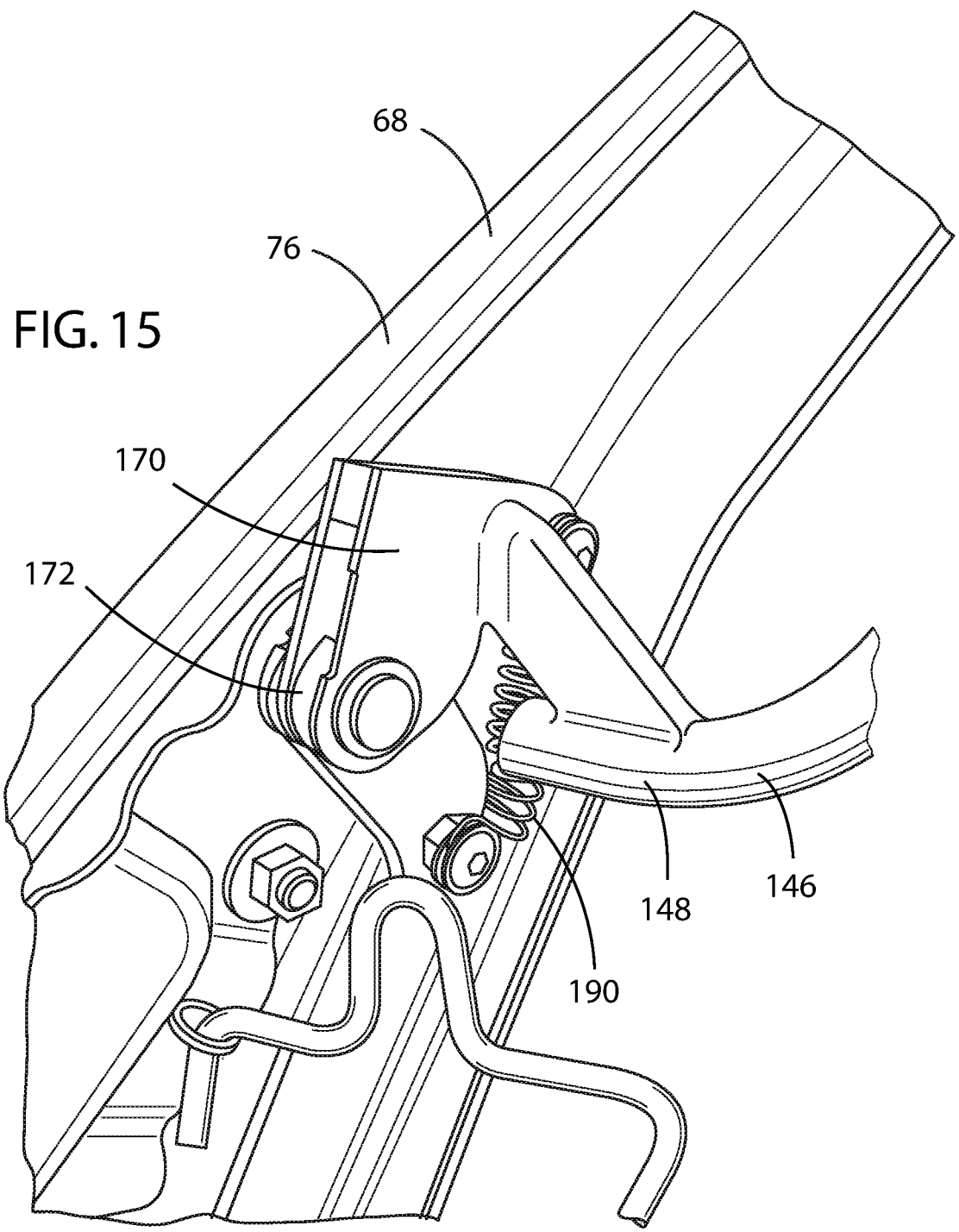
FIG. 15 is a side perspective view of the ratchet latch of the upper back support of the automotive seat assembly of FIG. 1 with the upper back support in the fully raised position.

The upper back support 140 preferably includes a tubular member 146 pivotally attached at a first end 148 to one of the pair of opposed lateral seatback frame members 74, 76 and pivotally attached at a second end 150 to the other of the pair of opposed lateral seatback frame members 74, 76. A substantially rigid planar base 152 is attached to a central portion 154 of the tubular member 146, as shown in FIGS. 12 and 14. The central portion 154 of the tubular member 146 preferably forms a substantially U-shaped and upwardly extending configuration within a plane of the seatback 14 when in the stowed position, as shown in FIG. 12. The substantially rigid planar base 152 is preferably attached to the central portion 154 of the tubular member 146 by fasteners arranged in regular intervals, as shown in FIGS. 12 and 14. Preferably, the substantially rigid planar base 152 is shaped in a "paddle"-like configuration and further comprises a raised support 156 proximate an upper edge 158 of the substantially rigid planar base 152 and disposed beneath the movable cushion 144. The substantially rigid planar base 152 of the upper back support 140 is preferably fabricated from a resilient plastic material, such as polypropylene, that provides sufficient support. The raised support 156 may be fabricated from foam padding or some other resilient material and is provided to ensure the desired height profile, as described herein.

The movable cushion 144 disposed above the upper back support 140 forms a movable exposed surface 162, which may be similarly fabricated as a trim 164 and foam pad 166 assembly to provide a finished look, where the trim 164 is fabricated locally with a resilient, stretchable, or flexible fabric material that allows the upper back support 140 to readily move relative the seatback 14. The use of a resilient trim material 164 disposed about the foam pad 166 further maintains a flat surface and eliminates wrinkling between the stowed position and the fully raised position.

Preferably, a ratchet latch 170 pivotally couples the first end 148 of the tubular member 146 to the inboard lateral frame member 74. The ratchet latch 170 comprises a ratchet gear 172 and ratchet pawl 174 operably coupled with the ratchet gear 172, as is known in the art. The second end 150 of the tubular member 146 is pivotally attached to the other lateral seatback frame member 76 by a simple pivot 176. The ratchet latch 170 operably couples the first end 148 of the tubular member 146 to the lateral seatback frame member 74 to restrain the tubular member 146 in one of a plurality of positions between the stowed position and the fully raised position. Preferably, displacement of the upper back support 140 beyond the fully raised position actuates the ratchet pawl 174 to an over-travel condition to return the ratchet latch 170 and the upper back support 140 to the stowed position, as is known in the art. That is, when the upper back support 140 is rotated beyond the last latch position corresponding to the fully raised position, the upper back support 140 is returned to its design position by articulating fullforward and employing a spring 190 to pull the upper back support 140 back to its design and fully stowed position.

Preferably, as shown in FIGS. 10-12 and 14, the upper back support 140 is disposed centrally between a first and second lateral edge 180, 182 of the seatback 14 and below the head restraint 26. Thus disposed, the upper back support 140 is designed to provide support between the shoulder blades of the motor vehicle occupant by use of a tubular member 146 to reduce muscle stress and increase neck blood flow. Similarly, as shown in FIGS. 3 and 4, the seatback 14 further includes the head restraint 26, which itself forms an exposed surface 178. As noted above, the movable cushion disposed above the upper back support 140 forms the movable exposed surface 162. With the upper back support 140 in the fully raised position, the exposed surfaces 162, 178 of the upper back support 140 and head restraint 26, respectively, form a substantially planar surface, as seen in FIG. 4.

The upper back support 140 is preferably controlled manually by pulling the upper back support 140 forward relative the seatback 14. In one embodiment, the upper back support 140 is moved from the stowed position to one of the plurality of positions by simply grasping the movable cushion 144 of the upper back support 140 and manually pulling the upper back support 140 forward to its desired raised position. Alternatively, the upper back support 140 may also include a pull strap 184 by which the upper back support 140 is pulled forward relative the seatback 14.

Figure 11:
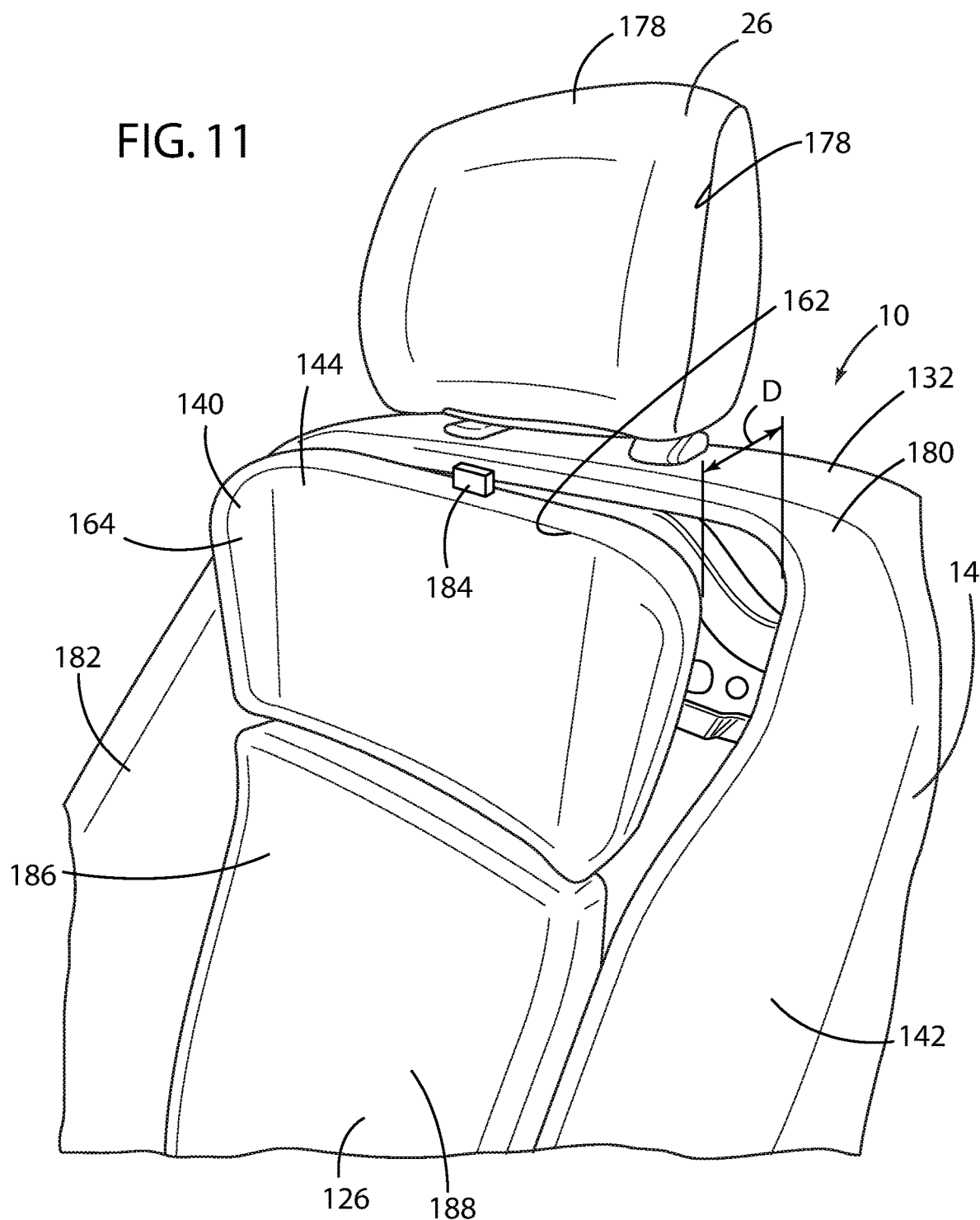
FIG. 11 is a front perspective view of the automotive seat assembly of FIG. 1 with the upper back support in the fully raised position.

In its stowed position, the upper back support 140 is preferably about 0° relative the plane of the seatback 14. Conversely, in the fully raised position, the upper back support 140 is preferably about 15° relative the plane of the seatback 14 the distance D between 7 and 10 cm, as shown in FIGS. 11 and 14. The ratchet latch 170, described above, provides a plurality of positions of the upper back support 140, and preferably provides a discrete position in intervals of 1.5° between the stowed position and the fully raised position.

Thus, as noted above and as further described herein, the exposed surface 178 of the head restraint 26 and the movable exposed surface 162 of the upper back support 140 is capable of forming a substantially continuous plane when the upper back support surface is in the raised position. The upper back support 140 accordingly provides many of the desirable features noted above relative the hip lifter mechanism 90.

Figure 10:
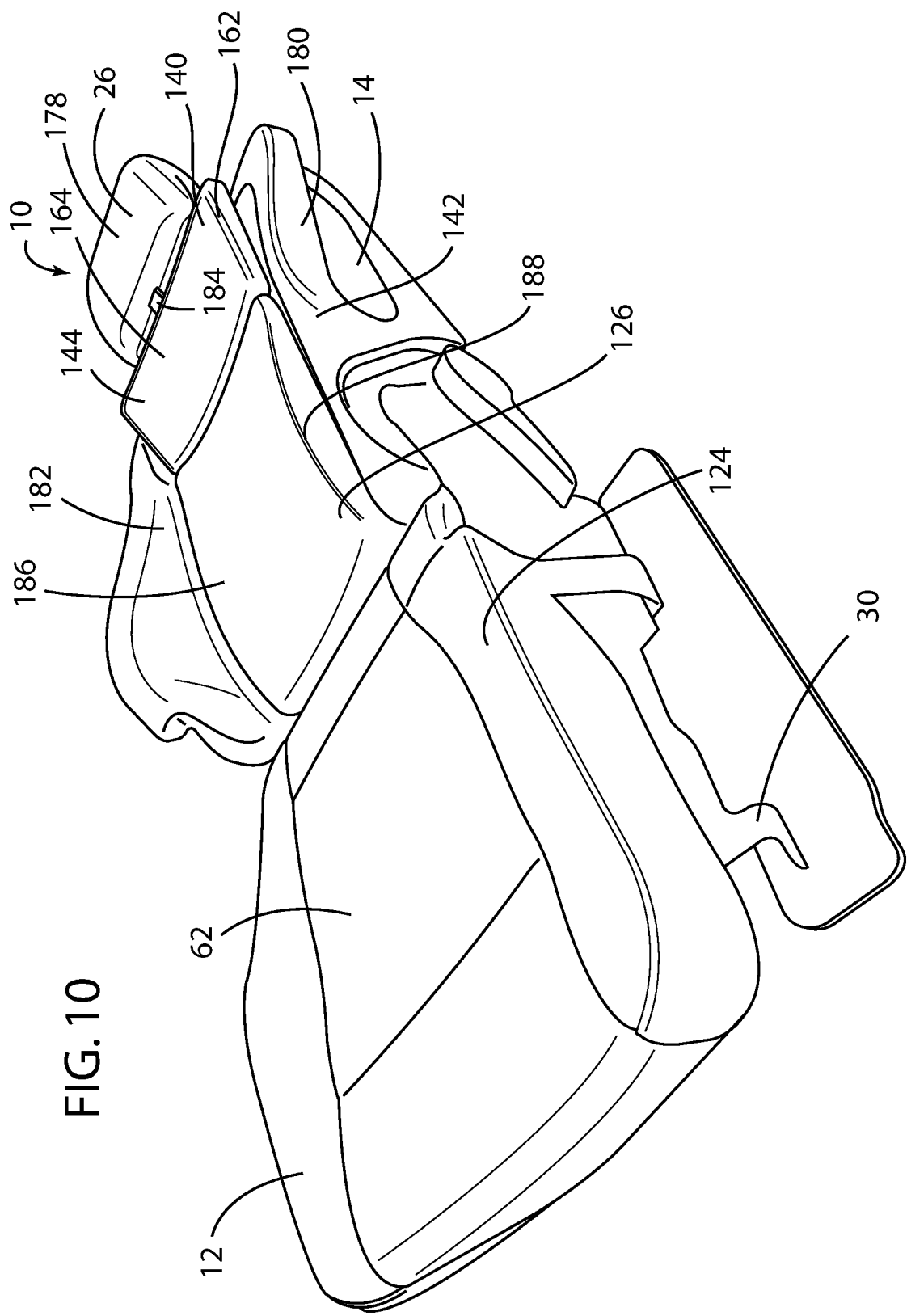
FIG. 10 is a front perspective view of the automotive seat assembly of FIG. 1 with the upper back support in the fully raised position.

In addition, a lower back support 186 may be disposed below the upper back support 140, and the lower back support 186 may be operatively coupled with the upper back support 140. Thus, when the upper back support 140 is raised from its stowed position, the lower back support 186 may be also raised relative a plane of the seatback 14 to provide a smooth and level transition between an exposed surface 188 of the lower back support 186 and the exposed surface 162 of the upper back support 140, as shown in FIG. 10.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A seating assembly comprising a lifter mechanism for an edge of a seat cushion, the lifter mechanism comprising a bracket pivotable about a transverse bar, the bracket comprising a forward lever and a rearward lever, and a link pinned at a first end to a seatback and pinned at a second end to the rearward lever via a slot, wherein the forward lever raises the edge upon the seatback pivoting to a predetermined reclined position;

wherein the slot has an upper end and a lower end and the rearward lever of the bracket comprises a pin received within the slot, wherein the lower end of the slot being proximate with the pin corresponds to an upright position of the seatback and wherein the upper end of the slot being in initial contact with the pin corresponds to the predetermined reclined position between an upright position and a fully reclined position; and wherein each of the seat cushion and the seatback have an exposed surface and wherein the exposed surfaces of each of the seat cushion and the seatback substantially occupying the same horizontal plane when the seatback is in the fully reclined position.

2. The seating assembly of claim 1, wherein pivoting the seatback between the predetermined reclined position and the fully reclined position urges the upper end of the slot against the pin to rotate the bracket and raise the forward lever and the edge of the seat cushion upwardly.

3. The seating assembly of claim 1, wherein the predetermined reclined position is about 55.5° relative a vertical plane.

* * * * *